May 3, 1927.

H. E. KRAMMER

AIRCRAFT

Filed Jan. 10, 1921

INVENTOR
Henry E. Krammer
BY
ATTORNEY

H. E. KRAMMER

AIRCRAFT

Filed Jan. 10, 1921

INVENTOR
Henry E. Krammer
BY
ATTORNEY

May 3, 1927.

H. E. KRAMMER

AIRCRAFT

Filed Jan. 10, 1921   7 Sheets-Sheet 6

1,627,185

INVENTOR
Henry E. Krammer
BY
ATTORNEY

May 3, 1927.

H. E. KRAMMER

AIRCRAFT

Filed Jan. 10, 1921

INVENTOR
Henry E. Krammer
BY
ATTORNEYS

Patented May 3, 1927.

1,627,185

UNITED STATES PATENT OFFICE.

HENRY E. KRAMMER, OF NEW YORK, N. Y.

AIRCRAFT.

Application filed January 10, 1921. Serial No. 436,239.

This invention relates to aircraft and in a measure the present application may be considered as a companion case to my earlier application, Serial No. 376,325, filed August 4, 1920, because it also comprehends the separable inter-relation of aircraft units and elements to comprise, in unified form, a composite aircraft.

As in my said earlier application the present case includes the rigid, though separable, union of a dirigible and an airplane with all the same facilities of joint and separate operation, and means of intercommunication; and further it possesses these new characteristics:—

1. The dirigible is provided with housing means for one or more airplanes whereby the latter may be entirely enclosed within the contour formation of the dirigible, so that with one or more airplanes contained or housed within the lighter-than-air craft, no additional head resistance is presented in flight, and the contained airplane or airplanes are entirely concealed, although capable of almost instantly taking flight from the dirigible.

2. While the housing means for airplanes in the dirigible is capable of admitting and containing airplanes having rigid or outspanned wings, I also provide collapsible or telescopic wings for the airplanes, so that, with the wing span contracted, a number of air planes may be ranged abreast, across the width of the housing therefor.

3. In the guided alighting means upon a dirigible for an airplane I now provide tensional retardation means to check the speed of the airplane while landing, thereby bringing it to rest.

4. Separate means are provided for raising, and lowering an airplane between its housed position and position for alighting upon and taking off from the dirigible, said raising and lowering means each comprising telescopic shafts, operable by compressed air, or otherwise; one of said shafts being seated in the cabin at the under side of the dirigible, and the other shaft being seated in the fuselage of an airplane that is in rigid, though separable, union with the dirigible, beneath the latter.

5. Rigid union between an airplane and a superposed dirigible is effected by connecting struts which are composed each of two parts, one part having a socket to receive a tongued portion of the other part, and a plunger rod transversely engages both said parts to unite them. The plunger rod carries a piston that is operable in a cylinder and compressed air may be introduced into the cylinder to move the piston and thus disengage the plunger rod from the strut parts; also magnetic means may be applied to the operation of the plunger rod.

6. Also the airplane has roller connection with the dirigible, through a slotted bearing in the latter, affording support to the airplane when the strut engagement is released and while the airplane is moving forwardly, at greater speed than the dirigible, until the airplane leaves the dirigible, in advance thereof.

7. An airplane unit, forming part of the composite aircraft, is capable of modification as by the separation therefrom of wing elements and fuselage elements until only a central fuselage element remains, and said central element is provided with a set of supporting parachute-like wings, that are normally collapsed but are extensible by telescopic means, which will permit the gradual descent of said fuselage element.

8. Further, said extensible wings, in a minor modification of the aircraft, in which its power plant and control means are retained, are capable of supporting the craft in flight.

9. The extensible wings are equipped with wireless apparatus whose operating motor, for sending a distress signal, is actuated by fans that are rotated in the parachute retarded descent of the craft.

Other features and advantages of my invention will hereinafter appear.

In the drawings:—

Figure 15 is a detail of burstable connecting means for aircraft units and elements.

Figure 1:
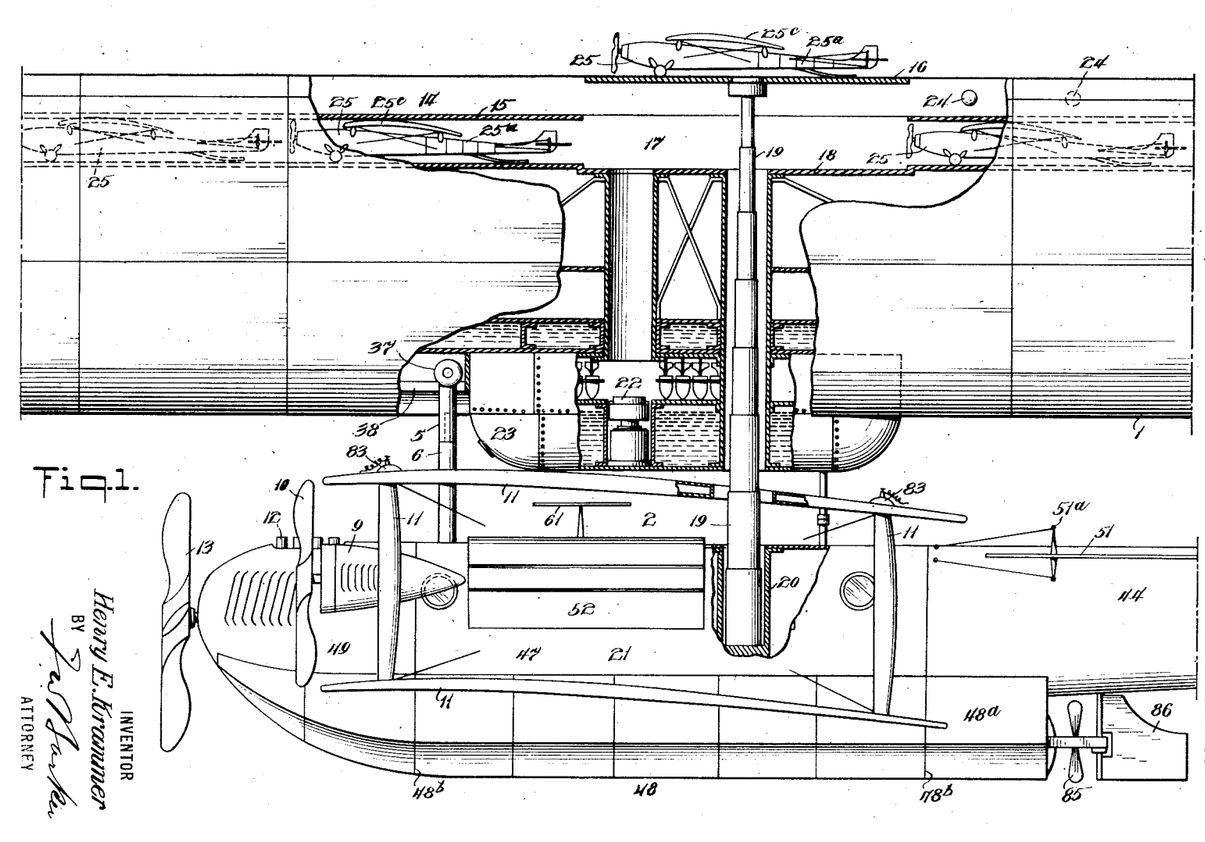
Figure 1 is a side elevation of a composite aircraft according to my invention, partly broken away, showing the completely enclosed housing means in a dirigible for a number of airplanes, means for moving airplanes to and from their housed position and their position in alighting upon and taking off from a dirigible, and also means for the separation of rigidly connected airplane and dirigible units.
Figure 2:
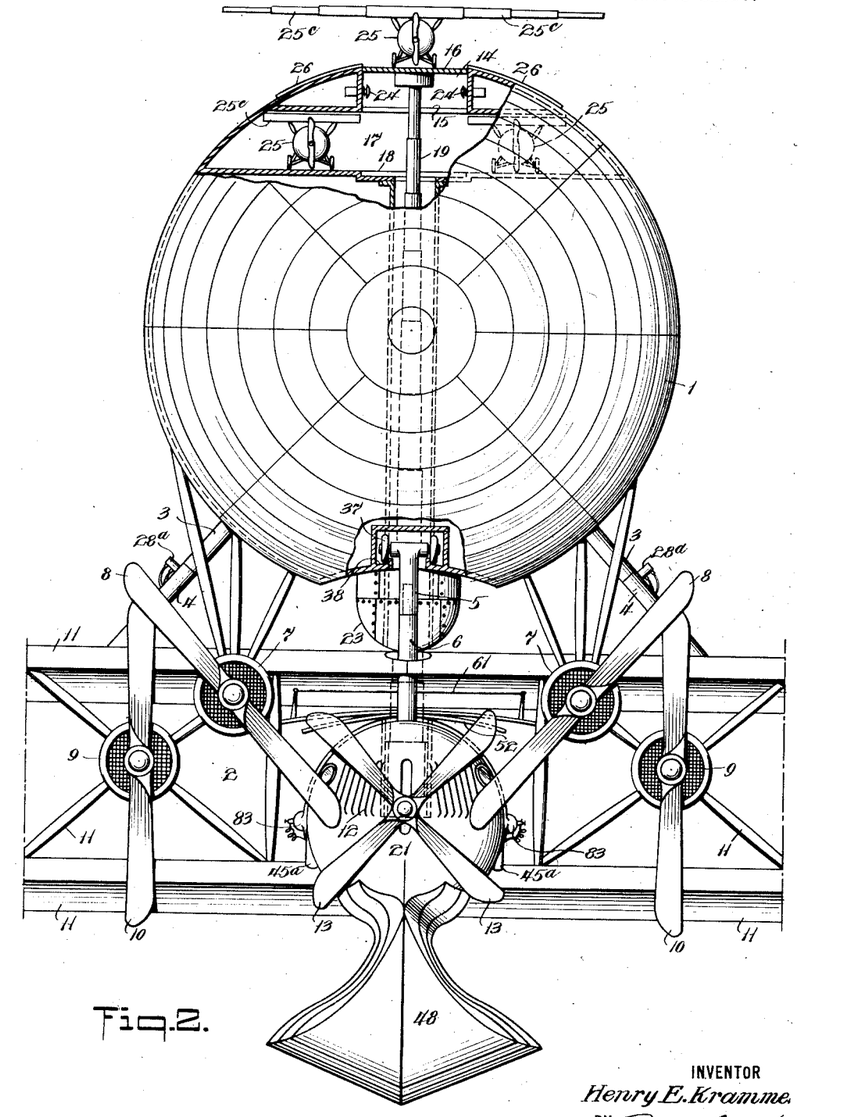
Figure 2 is an end elevation of Figure 1.

In Figures 1 and 2 I have shown a dirigible 1 with which is rigidly connected an airplane 2 by means of struts composed of two parts 3, 4, and a post composed of two parts, 5, 6, said struts and post having releasably engageable means, which will be described hereinafter.

The airplane, whose fuselage and keel portions comprise releasably engaged longitudinal sections, is supported beneath the dirigible that these two aircraft units may operate in unison in their connected relation, although when disconnected each of said units is independently operable. Thus, the dirigible unit is provided with power plants 7, having propellers 8, and is equipped with all the usual control means (these not being shown in the present views).

The airplane unit is shown as provided with power plants 9, with propellers 10, carried by its wing structure 11, and with the usual controls and empennage. The fuselage element is represented as having the power plant 12, with propeller 13.

As in my former application, Serial No. 376,325, the dirigible unit is provided with an airplane alighting and taking off channel in its upper portion, said channel being here indicated at 14; but the base 15 of said channel includes a vertically movable section 16, and said base serves as the upper covering for an airplane housing space 17, with supporting base 18, that is entirely enclosed when the section 16 is seated in its midway position, so that the contained airplanes are concealed from view, fully protected from the elements, and in noninterfering relation with the operation of the dirigible.

The section 16 is intended to be applied as a hoist, for, with an airplane that has landed in the channel and has been imposed upon said section, the latter, by means of the telescopic shaft 19, whose base is rooted in a well 20 provided therefor in the fuselage 21 of airplane 2, may be lowered to the base 18, then permitting the airplane it carries to be shifted into a suitable stored position in space 17. As indicated the space 17 may have sufficient length for the storage of a large number of airplanes whose wings are outspanned, and, as shown in Fig. 2, this number may be increased where the airplane wings have been telescoped or contracted, thus enabling the width of space 17 to accommodate several airplanes abreast.

In Figure 1 there will be noted another telescopic hoisting device 22, seated in the cabin 23 of dirigible 1, and extensible through a passage vertically penetrating the dirigible to the housing space 17, in order that it may serve the purpose of raising and lowering section 16, instead of shaft 19, as when the airplane unit is separated from the dirigible.

The channel 14, which extends both rearwardly and forwardly of the dirigible, is intended to receive alighting airplanes at its rearward portion, the airplane moving in the same direction of travel as the dirigible, and said channel, in its rearward portion is provided with spring extended detents 24, (shown in detail in Figure 10) that project from the channel sides into the path of the alighted airplane, to yieldingly co-act with the fuselage sides and thus impede the airplane speed of travel in the channel, thereby aiding the airplane to come to rest. The forward portion of channel 14 is not equipped with these detents, because the airplane is to take off from this forward portion.

It will be appreciated that when an airplane as that indicated at 25, with fuselage sections 25ª and wing sections 25ᶜ is rigidly secured upon the section 16, as in the manner described in my application Serial No. 376,325 or otherwise, it thereby becomes an integral part of the dirigible, and, when elevated to the position shown in Figure 1, the propulsive means of said airplane may serve to augment the travel speed of the thus constituted composite aircraft. Obviously, several airplanes abreast, with their wings contracted, may be secured upon the section 16, and operated to the same effect.

I have indicated in Figure 2, at 26, a channel covering which may be slidable about the circular contour of the dirigible or otherwise applicable to open or close the channel 14, said covering, when adjusted to close the channel, thereby enabling the dirigible to present an unbroken contour surface, to avoid the creation of suction, speed-retarding effects in flight.

Figures 9, 10:
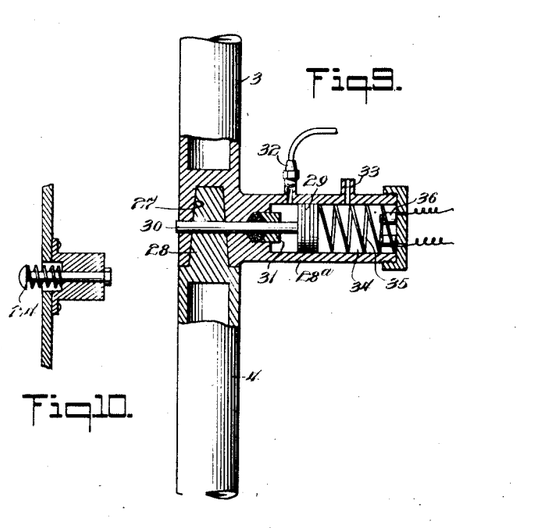
Figure 9 is an enlarged detail view of one of the sectional struts comprising the rigid connection between airplane and dirigible units, showing the compressed air and magnetic means for separating the strut sections.
Figure 10 is a detail, in section, of a wall in the guide channel of a dirigible for the reception of an alighting airplane, equipped with speed retarding means.

The novel connecting and disconnecting means for the struts which releasably provide for the rigid union of aircraft units in a composite structure, is more particularly shown in Figure 9, wherein the strut part 3 has an axial, tapered socket 27 to receive an axial, tapered tongue 28 extended from the strut part 4. The part 3 also carries a lateral projection 28ª in the form of a cylinder, in which is a piston 29, having a plunger rod 30, that works through a stuffing box 31, and slidably fits aligned orifices therefor in the socket and tongue portions respectively of parts 3 and 4, to unite said parts. A pipe connection 32 with cylinder 28 serves for the introduction of compressed air, or other expansible medium derived from a suitable source (not shown), whereby the piston is moved outwardly, thereby withdrawing rod 30 from its engagement with the tongue and socket, and releasing the engagement of strut parts 3 and 4. The vent 33 permits the piston operation by exhausting the outward chamber 34. A spring 35 in said outward chamber normally holds the piston extended, with its rod 30 in engaged relation with the socket and tongue portions aforesaid. Also, auxiliary to the air pressure operating means for piston 29, or for independent use, I provide an electro-magnet 36, to co-act with the piston 29 for its magnetic operation.

A suitable number of struts, each composed of parts 3, 4, may be employed to connect the aircraft units 1, 2, to ensure the efficient rigidity of that union; but, when the strut parts 3, 4 are disconnected (and it is my purpose to cause the disconnection to occur at the same time with all of these struts), then the only tie between units 1 and 2 will be that afforded by the post composed of parts 5, 6, whereof the part 6 is anchored in the unit 2 and the part 5 engages by a roller 37 with a longitudinally slotted bearing 38 along the bottom of the dirigible.

Hence, with the strut parts 3, 4 disconnected the airplane 2 will be free to travel forwardly with respect to the dirigible, the roller maintaining connective support for the airplane until said roller leaves its slot at a forward point along the dirigible, when the airplane will operate independently.

Figure 8:
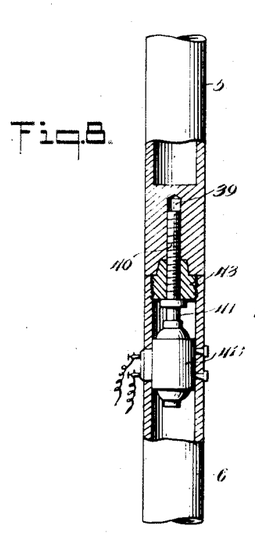
Figure 8 is an enlarged detail of the sectional post forming part of the rolling connection between the dirigible and airplane units, showing the motor operated means for separating the post sections.

Should, however, it prove desirable for simultaneous disconnection of the post and struts, then the post parts disconnecting means shown in Figure 8 may be operated. By reference to said figure it will be noted that the part 5 has an axial, threaded socket 39, with which is engaged a screw 40, that comprises an extension of rotor 41, axially movable relatively thereto, and operable in a magnetic field 42, thus comprising a motor that is contained within a hollowed out portion of post part 6. The rotor has thrust bearing against a threaded plug 43, that closes the end of part 6, causing the screw 40 to withdraw from its engagement with part 5 under the operation of the motor.

Figure 3:
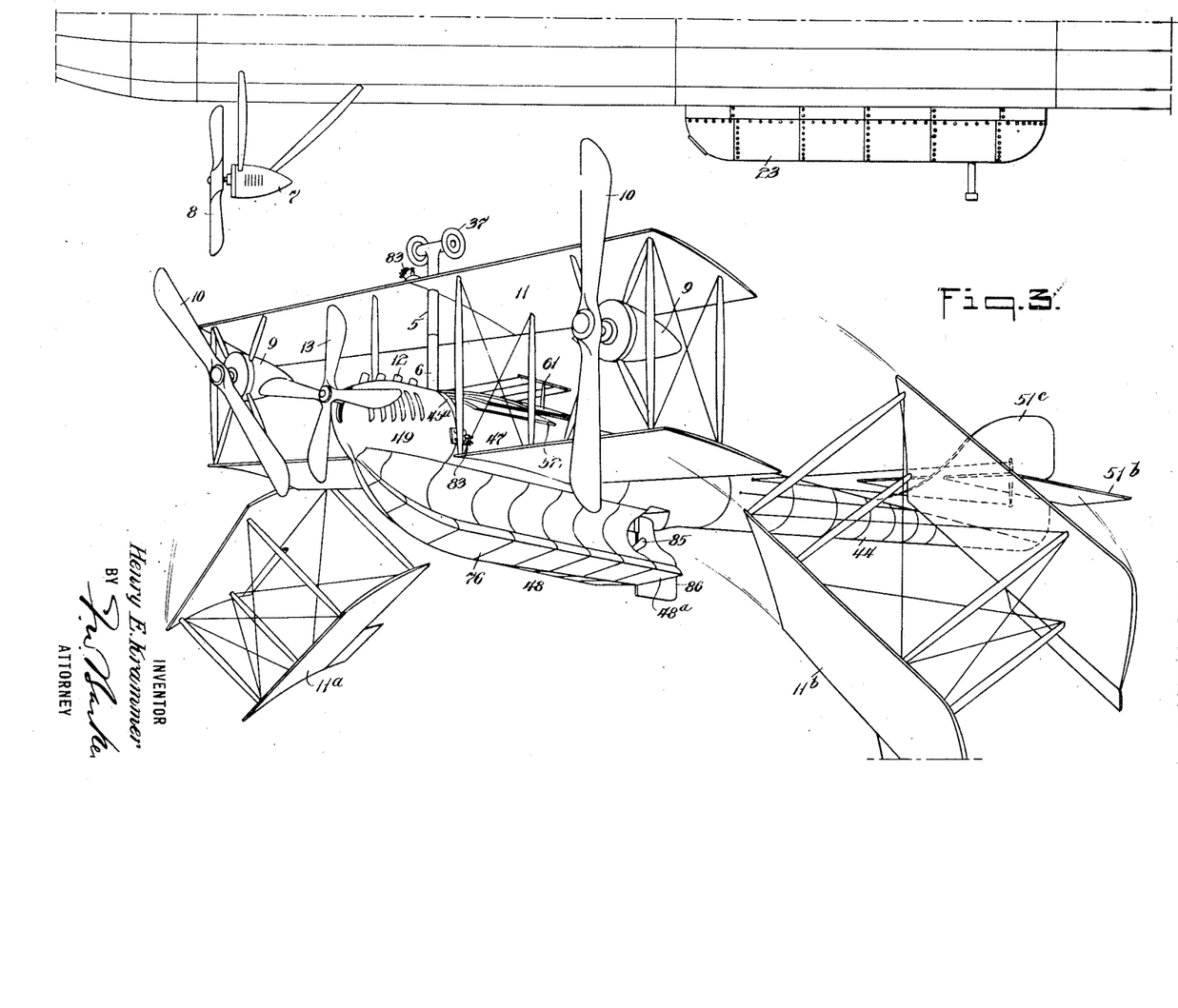
Figure 3 is a side elevation of a dirigible unit from which the airplane unit has been separated, the latter having its wing end elements separated therefrom.

As in my earlier application, Serial No. 376,325, my purpose in the present aircraft structure is to have elements of an aircraft unit rigidly but disengageably connected, the airplane unit having its fuselage composed of longitudinal sections, also the flotation or keel portion where the airplane is so equipped. The wings likewise are composed of sectional elements, thus permitting the heavier-than-air unit to be susceptible of modification, while under operation, to change its character while still leaving intact an operable portion, (see Figure 3).

The wing sections are connected by burstable couplings which are more particularly referred to hereinafter, and the entire wing structure is supported upon the fuselage by means of saddle-like members 45ª, which engage in seats 45ᵇ provided therefor in the upper portion of the fuselage. Said members 45ª are in two parts, united as by burstable couplings.

Figure 4:
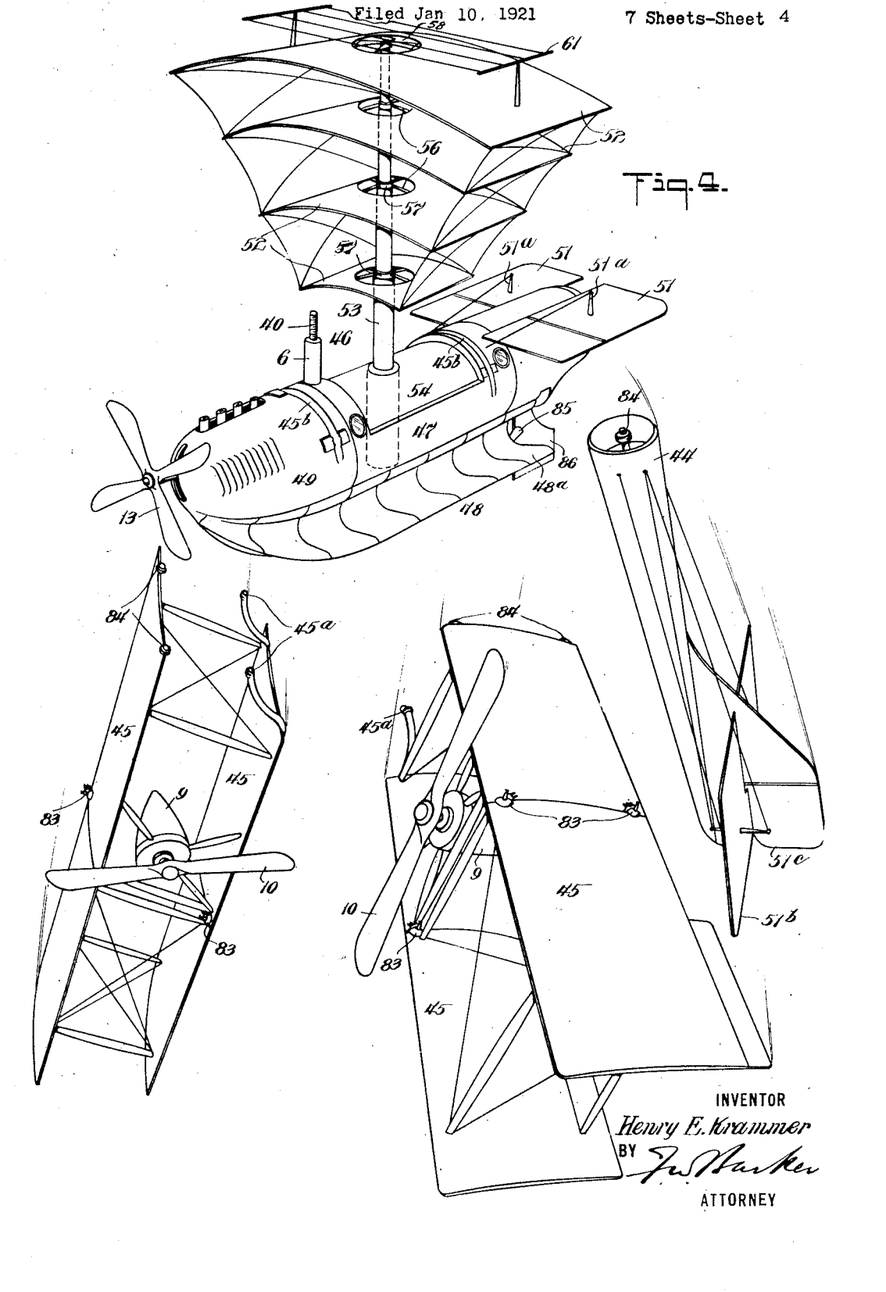
Figure 4 is a perspective elevation of an airplane unit that has been separated from a dirigible unit, said airplane unit having its entire main supporting wings and its fuselage tail portion separated and falling away therefrom, leaving the fuselage with its power plant and auxiliary control members intact, and with a set of normally collapsed auxiliary supporting members extended in superposed relation.

Thus, in Figure 4 I have shown a view of an airplane unit from which the tail section 44 has been detached; also both side wing elements 45, with the power plants they carry, have been detached, leaving however a modified unit 46 of operable nature. Said unit 46 now comprises the fuselage portion 47, with keel portion 48 whose rearmost section 48ª may contain a motor; and engine section 49, having propeller 13. Said unit also has the control members 51, with connections 51ª, which are operable in this modified form of the aircraft, though they had been held stationary, to be neutral, with the complete or unmodified form of the heavier-than-air unit.

Support for this modified form of airplane unit is afforded by a superposed series of wings 52, carried by an extensible mast 53, that is shown as telescoped with the wings 52 collapsed in Figures 1 and 2, but in Figure 4 is shown extended and with the wings extended for support and flight. When the wings 52, with mast 53 are collapsed, said wings are then compactly seated in a saddle like recess 54 therefor in the upper surface of the fuselage.

It will be appreciated that in this modified form of airplane the latter will be capable of sustained flight after the main supporting wings and tail portion have been removed. Obviously such removal, under operation of the craft, may have been necessitated by these parts having become damaged.

The mast 53 is extensible to its operative position by the application of compressed air or other expansion means, and its sections respectively carry the wings 52 with them.

Figure 5:
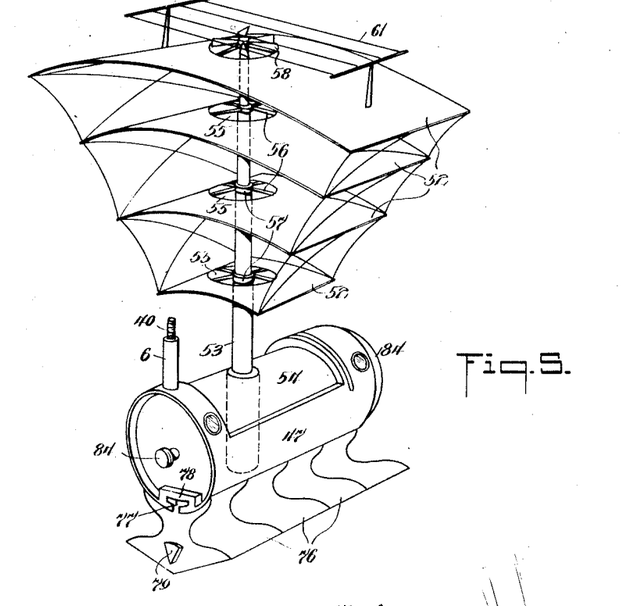
Figure 5 is a perspective view of the central fuselage section, with the power plant section and rear section carrying the auxiliary control members separated and falling away therefrom, the extended, superposed supporting members in the view functioning as a parachute to retard the speed of descent.

Should it occur that the power plant section 49 and the rear fuselage section carrying control members 51 are also to be removed through damage thereto or for other reasons, then the craft will be further modified or reduced (as in Figure 5) to the central fuselage section 47, without power means or control, and the wings 52, being extended, may function as a multiple parachute, to permit the gradual descent of the thus shorn unit, thereby conveying the passengers in the fuselage safely to the surface of land or water.

As seen in Figures 4, 5, 6 and 7, the wings 52 each have a central orifice or vent 55. This orifice is equipped with a spider 56, whose arms radiate from an annulus 57 that serves as a collar for engagement with a section of staff 53, and there is also revolubly mounted on the topmost staff section a fan 58, that in the descent of the parachute, is revolved by the passage of air through the orifice; the operation of the fan also having the effect of helping to retard the descent of the craft.

Figure 6:
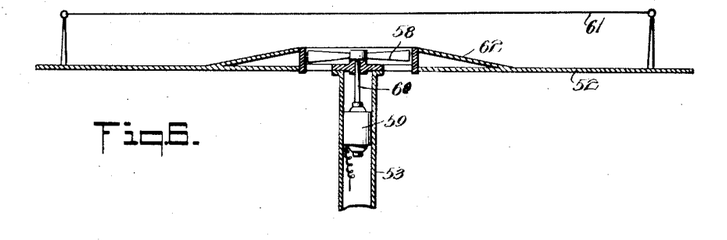
Figure 6 is a detail, in vertical section, of a parachute member, with a fan in its centered orifice, wireless apparatus, and a motor actuable by said fan for sending a distress signal.
Figure 7:
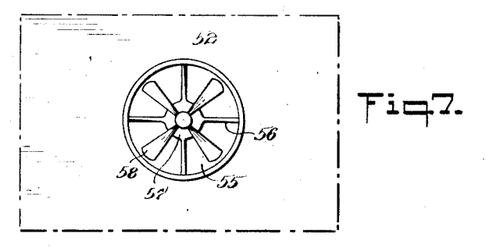
Figure 7 is a partial plan view of Figure 6.

Also, the staff 53, being hollow, contains a motor 59, whose rotor has an extended shaft 60, said shaft carrying the fan 58, so that the motor becomes energized through the fan rotation, and thus is enabled to automatically actuate a distress signal by means of wireless apparatus 61 carried by the topmost wing 52. The fan 58 is housed in a circular enclosure 62 of stream-lined character.

It will be apparent that the fuselage employed with the aircraft unit 2 of the present application corresponds with that shown in my application Serial No. 243,565, it having the telescoping sections 62ª, with spring detents 63 carried by one section, to engage with holes 64 in an adjacent section, so that said sections will enter into locked relation when extended.

The detents 63 each have a plunger head 65 that is reciprocable in cylindrical housing 66, and is normally urged outwardly, to project the detent through an orifice in the forward closed end of the housing, by means of a spring 67; while suitable means may also be provided for retracting said plunger and detent. As an example of such retracting means I have indicated in Figure 11 an electro-magnet 68; but in Figure 13 I have shown a pipe 69, by which compressed air or other expansion power means may be introduced to the housing to effect the retraction.

In either example of these detent retraction means for detachable release of aircraft sections, the control thereof may be actuated as by switch 63ª or valve 69ª from a central station, which I prefer to locate in the section 47, the control means being of such character that the detents may be retracted either simultaneously or selectively.

Each section is provided with a longitudinal groove 70 in the inner surface of its structural material to serve as a guide for a detent carried by an adjacent section, to direct said detent when drawing out the sections from a collapsed slate to their extended position,—the ends of the detents lying against the grooves, under their spring tension until, with the sections in fully extended positions, the holes in adjacent sections come into alignment, and then the springs cause the detents to effect the locking engagement between the sections, to hold them extended.

Figures 11, 13, 14:
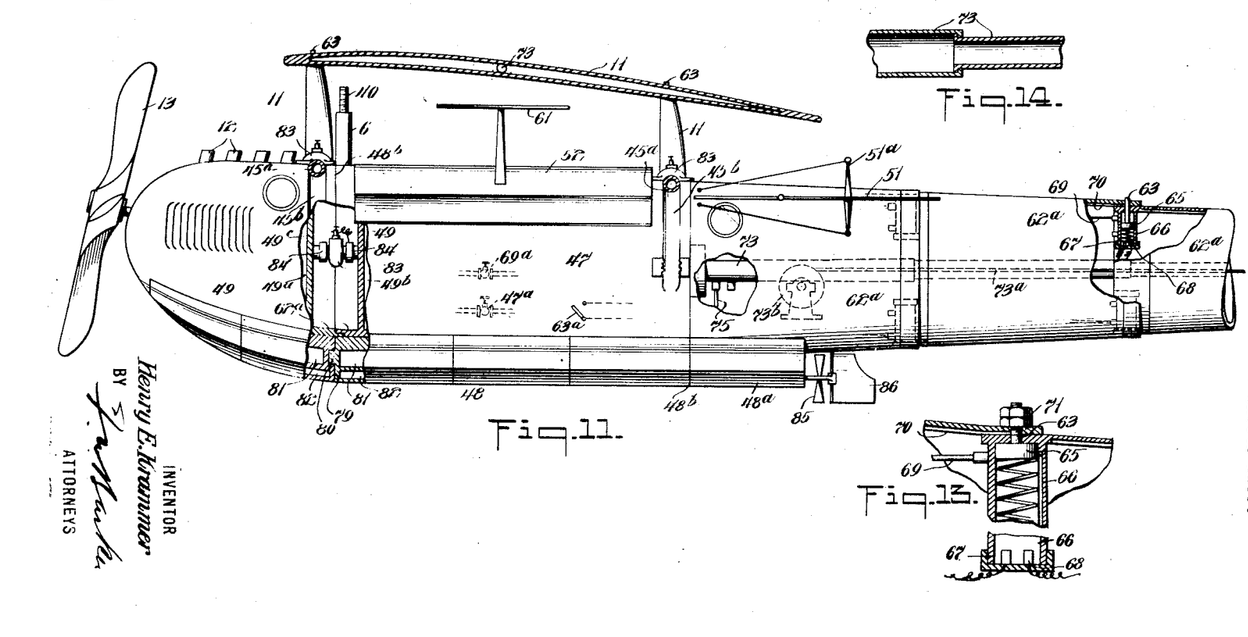
Figures 11 and 12 are, respectively, the front and rear portions, in side elevation, partly broken away to disclose structural features, of a heavier-than-air craft unit comprised in my invention.
Figure 13 is an enlarged detail view of uniting means for aircraft sections, and locking means therefor.
Figure 14 is a detail showing a portion of the telescopic means for extending collapsed aircraft sections.
Figure 12:
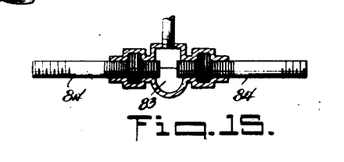

In Figure 13 I have shown a detent 63 as threaded, and having lock nuts 71 applied thereto, to prevent retraction and provide a rigid, permanent lock, for employment when the union of parts is not required to be disturbed. Although, when the craft is on the surface the aircraft sections may be extended by manual effort, for which purpose the tail section is provided with a handle 72, to be grasped by an operator for the purpose of drawing out the sections, I also provide means whereby the sections may be extended while the craft is in the air. These means comprise a telescopic shaft 73, which terminates at one end in or near the fuselage section 47 and is operable therefrom, said shaft extending through all the sections to the tail section, with which it engages as at 74. For extending said shaft compressed air on other expansion medium may be introduced into it at its portion lying in or near section 47, as by valve 47ª under the control of an operator, and it is by such pressure means that the shaft is extended and serves to carry the sections of the aircraft out to their extended positions. In Figure 11 I have shown a pipe 75 as serving to convey the expansion medium to shaft 73. The shaft 73 may be collapsed and thus caused to telescope the sections 62ª by means of a cable 73ª which is to be wound on a drum 73ᵇ.

While I have particularly illustrated the detent locking and releasing means in connection with the fuselage sections of an aircraft, I also intend the collapsible wings employed with my improved aircraft to be similarly provided, in order that they also may be collapsed and extended through similar agencies and under like controls. As an indication thereof, to be apparent in the drawings, the wing structure in Figure 11, will be seen to have instrumentalities corresponding to those described with respect to the fuselage sections. The keel portion 48 of the airplane fuselage is composed of endwise sections 76, which each have a T-head upper portion 77, for longitudinally slidable engagement with a saddle-like or dove-tail channel 78 formed in the under surface of the fuselage, so that said keel sections may be removably connected thereto. Also, adjacent sections are respectively provided with end-wise abutting lugs 79 and recesses 80 to receive them, to connect the sections against vertical displacement. The sections 76 are each divided into upper and lower air-tight compartments 81 and 82.

As in my earlier application Serial No. 376,325 the aircraft units and elements comprised herein are releasably and detachably united by couplings that are burstable by power expansion means, of which a detail is shown in Figure 15, as including the casing 83, to contain an expansion medium, and the mechanical connecting means 84 whereby said casing is attached respectively to adjacent bodies. These mechanical connecting means, forming part of the burstable coupling, will be found in a number of the figures of the drawings, where the bodies have been detached, and where the bodies are shown attached the burstable couplings are indicated by the numeral 83.

The keel 48 is provided with a propeller 85 that can be operated by a motor contained in the rearmost keel section 48ª as in my case Serial No. 376,325; and also has a rudder 86, for control of the craft both on water and in the air.

Variations within the spirit and scope of my invention are equally comprehended herein.

I claim:

1. A dirigible having an alighting channel and provided with closure means therefor included in its circular contour.

2. A dirigible having means included in its circular contour for housing an air plane whose wings are out-spanned, and closure means therefor also included in said circular contour.

3. A dirigible having means for the alighting thereon of an airplane, closure housing means, and means for moving an airplane to and from said housing means.

4. A dirigible having an alighting channel for airplanes, housing means below said channel, and means for moving an airplane between the level of said channel and said housing means.

5. A dirigible having an alighting channel for airplanes, housing means below said channel, a vertically movable base section for said channel, and operating means for said section whereby an airplane supported thereon may be moved between said channel and said housing means.

6. A dirigible having an alighting channel for airplanes, a vertically movable section for said channel, and operating means for said section whereby an airplane secured thereon may be moved between said channel and an elevated position.

7. A dirigible having an alighting channel for airplanes, and resilient means in said channel in the path of an airplane fuselage, to retard the speed of the airplane in said channel.

8. An airplane whose wings are composed of spanwise telescopic sections, separate interlocking means between adjacent sections to hold said sections extended, and lock releasing means to permit their contraction.

9. In a composite aircraft comprising a dirigible unit and an airplane unit, in disengageably secured superposed relation, said dirigible having means for the alighting thereon of an independent aircraft, in combination, means seated in said airplane unit and extensible through said dirigible unit for vertically moving said independent aircraft relatively to said dirigible unit, and also auxiliary means, seated in said dirigible unit, and extensible therethrough for similarly moving said independent aircraft.

10. In a composite aircraft comprising a dirigible unit and an airplane unit, the combination of two part struts connecting said units, uniting means for said strut parts, and pressure means to release said uniting means.

11. Connecting means for separate aircraft units comprising a socket member engaging one unit, a tongue member engaging the other unit, a plunger rod engaging said socket and tongue members, a cylinder, a piston carrying said plunger rod and operating in said cylinder, and means for introducing air under pressure into said cylinder, to actuate said piston and release said plunger rod from its engagement with said socket and tongue members.

12. Means for rigidly engaging separate aircraft units, comprising a plunger rod engageable with said units, and compressed air means for releasing said plunger rod to thereby disconnect said aircraft units.

13. Means for rigidly engaging separate aircraft units comprising a plunger rod engageable with said units, tensional means to hold said rod in operative position, and compressed air means for releasing said rod to thereby disconnect said aircraft units.

14. Means for rigidly engaging separate aircraft units comprising a plunger rod engageable with said units, and magnetic means for releasing said plunger rod to thereby release said aircraft units.

15. In a composite aircraft, in combination, a dirigible unit having a guide slot, an airplane unit having a post, and a roller carried by said post for engagement with said guide slot, whereby said airplane unit may travel in advance of said dirigible unit in guided relation therewith until the roller leaves the guide slot.

16. In a composite aircraft, in combination, a dirigible unit having a guide slot, an airplane unit having a post, and a roller carried by said post for engagement with said guide slot, said post comprising a socket member and a threaded member engaging said socket, and a motor to rotate said threaded member and thereby release it from said socket member.

17. An airplane having detachable fuselage sections, and means for modifying said airplane while operating above the surface by detaching fuselage sections therefrom.

18. An aircraft having lateral wings and superposed, normally collapsed, central wings, means for detaching said lateral wings under operation, and means for extending said collapsed wings for support.

19. An airplane having an auxiliary set of normally collapsed, superposed, central wings, each with a central orifice, means for modifying said airplane under operation by detaching therefrom its wings, also the fuselage sections including the power plant and control members, and means for extending said central wings whereby said modified aircraft may then serve as a parachute.

20. A parachute comprising a set of superposed wings, extensible from a fuselage section, each wing having a central orifice, and a fan mounted in one of the orifices to retard the speed of descent.

21. A parachute comprising a set of superposed wings, extensible from a fuselage section, each wing having a vent orifice, a fan mounted in an orifice to retard the speed of descent, a wireless apparatus carried by said parachute, and a motor energized by said fan for the issuance of a distress signal.

22. A parachute having a fan mounted in its vent orifice, a motor whose energy is generated by said fan in the descent of the parachute, and signal means actuable by said motor.

23. A dirigible having means within its cross-sectional, circular contour for completely housing an air plane, and means whereby communication to and from said housing may be had under operation.

24. A dirigible having a recessed landing channel for an air plane, and provided with removable covering means for said channel included in its circular contour.

25. An aircraft having separable units and elements, uniting means therefor, non-manual power release means for said uniting means, and control means for the selective and combined actuation of said release means.

26. An aircraft having separable units and elements, uniting means therefor, non-manual power release means for said uniting means, actuable while the aircraft is under operation, and control means for the selective and combined actuation of said release means.

27. An aircraft having a recessed runway channel for the releasable engagement therewith of another aircraft.

28. An aircraft having a recessed runway channel in its lower portion and another aircraft having roller means for releasably engaging said channel.

29. Uniting means for aircraft units which is in part revoluble for engaging and disengaging purposes, and non-manual power means for actuating said uniting means.

30. Aircraft units having means of shiftable engagement one with another, and non-manual power means for shifting one of said units relatively to another.

31. Aircraft units having revoluble means of separable engagement one with another, and non-manual power means for revolving said engaging means to separate one of said units from the other.

32. The combination with an aircraft of superposed airplanes in detachable and separable homogeneous engagement therewith.

33. The combination with an aircraft of a superposed airplane in detachable and separable engagement therewith, said airplane having telescopic wings, and pneumatic means for extending and contracting said wings, under operation.

34. The combination with an aircraft of a superposed airplane in detachable and separable engagement therewith, said airplane having telescopic wings, and pneumatic means for contracting said wings, under operation.

35. An airplane whose fuselage is composed of individually detachable and separable sections which are telescopic while the airplane is in operation.

36. An airplane whose fuselage is composed of individually detachable and separable telescopic sections, and means for extending and contracting said fuselage.

37. An airplane whose fuselage is composed of individually detachable and separable telescopic sections, and non-manual power means for extending said fuselage.

38. An airplane whose fuselage is composed of individually detachable and separable telescopic sections, and means for contracting said fuselage, under operation.

39. An airplane whose wings are composed of telescopic sections, and pin and slot means for guiding said sections while being extended.

40. An airplane whose wings are composed of telescopic sections, plunger means for locking said sections in their extended positions, and guide means for said locking means while being extended.

41. An airplane whose wings are composed of telescopic sections, plunger means for locking said sections in their extended positions, and lock release means actuable under operation of the airplane.

42. An airplane whose wings are composed of telescopic sections, plunger means for locking said sections in their extended positions, and securing means for said locking means.

43. An airplane whose fuselage is composed of telescopic sections, and pin and slot means for guiding said sections while being extended.

44. An airplane whose fuselage is composed of telescopic sections, plunger means for locking said sections in their extended positions, and guide means for said locking means while being extended.

45. An airplane whose fuselage is composed of telescopic sections, plunger means for locking said sections in their extended positions, and lock release means actuable under operation of the airplane while being extended.

46. An airplane whose fuselage is composed of telescopic sections, plunger means for locking said sections in their extended positions, and securing means for said locking means.

47. The combination in an airplane, of an element thereof composed of telescopic sections, means for extending said sections, locking plunger means and lock releasing means for said sections in their extended positions, said locking and lock releasing means being housed within said element.

48. The combination, in an airplane, of an element thereof composed of telescopic sections, means for extending and means for contracting said sections, plunger means for locking said sections in their extended position, lock guiding means, and lock releasing means, said extending, contracting, locking, lock guiding and lock releasing means all being housed within said element.

49. The combination, in an airplane, of an element thereof composed of telescopic sections, means for extending and means for contracting said sections, and non-manual power means for locking said sections when extended.

50. The combination, in an airplane, of an element thereof composed of telescopic sections, means for extending and means for contracting said sections, means for locking said sections when extended, and non-manual power means for releasing said locking means.

51. An aircraft having a body portion and provided with superposed, normally collapsed, curved support elements, said body portion having a curved seat for the reception of said elements.

52. An aircraft having an auxiliary support element with a vent orifice, a fan revoluble in said orifice, and an electric generator energizable by said fan in the operation of said support element.

53. An aircraft having an auxiliary support element with a vent orifice, a fan revoluble in said orifice, a housing for said fan, and an electric generator energizable by said fan in the operation of said support element.

54. An aircraft having an auxiliary support element with a vent orifice, a fan revoluble in said orifice, an electric generator, a housing therefor, and connecting means whereby the operation of said fan serves to energize said generator.

55. An aircraft having a support element with a vent orifice, a fan revoluble in said orifice, an electric generator energizable by said fan, signalling means, and means whereby energy from said generator serves to actuate said signalling means.

56. An aircraft having separately detachable propelling steering and stabilizing elements, and means whereby said aircraft may be propelled, steered and stabilized after the detachment, under operation, of said elements.

57. In combination with a relatively large aircraft, means for receiving, during flight, a relatively smaller aircraft and housing the said smaller aircraft within the streamline of the larger aircraft, said means including an aperture in the external skin of the said larger aircraft and a door adapted to close said aperture substantially flush with the said external skin.

58. In combination with a relatively large aircraft having an opening into the inclosed portions of said aircraft, said opening adapted to permit the entrance of a smaller aircraft during flight of the larger aircraft, and power means to open and close the said opening.

Signed at the borough of Manhattan in the city, county and State of New York this 7th day of January, A. D. 1921.

HENRY E. KRAMMER.